United States Patent [19]

Papathomas et al.

[11] 4,451,773

[45] May 29, 1984

[54] RECTIFIER CONTROL SYSTEM FOR A DC POWER PLANT SYSTEM

[75] Inventors: Thomas V. Papathomas, Madison, N.J.; Rudolph Scuderi, deceased, late of Mountain Lakes, N.J.; by May S. White, co-executrix; by Camille D'Ambrose, co-executrix, both of Amsterdam, N.Y.

[73] Assignee: Bell Telephone Laboratories, Incorporated, Murray Hill, N.J.

[21] Appl. No.: 365,017

[22] Filed: Apr. 2, 1982

[51] Int. Cl.³ .......................... H02J 7/04; H02M 7/08
[52] U.S. Cl. ...................................... 320/59; 307/48; 363/69; 363/81
[58] Field of Search ...................... 363/67, 69, 70, 75, 363/81; 320/59; 307/31, 48; 179/70, 77

[56] References Cited

U.S. PATENT DOCUMENTS

| 1,072,443 | 9/1913 | Ferguson | 363/69 |
| 3,356,928 | 12/1967 | Parrish | 363/70 |
| 3,746,967 | 7/1973 | Koltuniak et al. | 363/70 |
| 3,843,918 | 10/1974 | Rhyne | 320/59 |
| 4,285,023 | 8/1981 | Kalivas | 363/75 |

OTHER PUBLICATIONS

Proceedings of the Third International Telecommunications Conference, "Stored-Program Control of DC Power Plants", May 19–21, 1981.

Primary Examiner—William H. Beha, Jr.
Attorney, Agent, or Firm—Alfred G. Steinmetz

[57] ABSTRACT

A DC power plant system has the operation of its individual rectifiers controlled by a stored program control system for the purpose of optimizing power efficiency. Load power requirements are compared with rated capacities of operating rectifiers of the system and individual rectifiers are turned on or off so that the plant efficiency is always maximized. Rectifiers are selected for turn on and off in the basis of their rated power capacity and their accumulated operating times.

28 Claims, 5 Drawing Figures

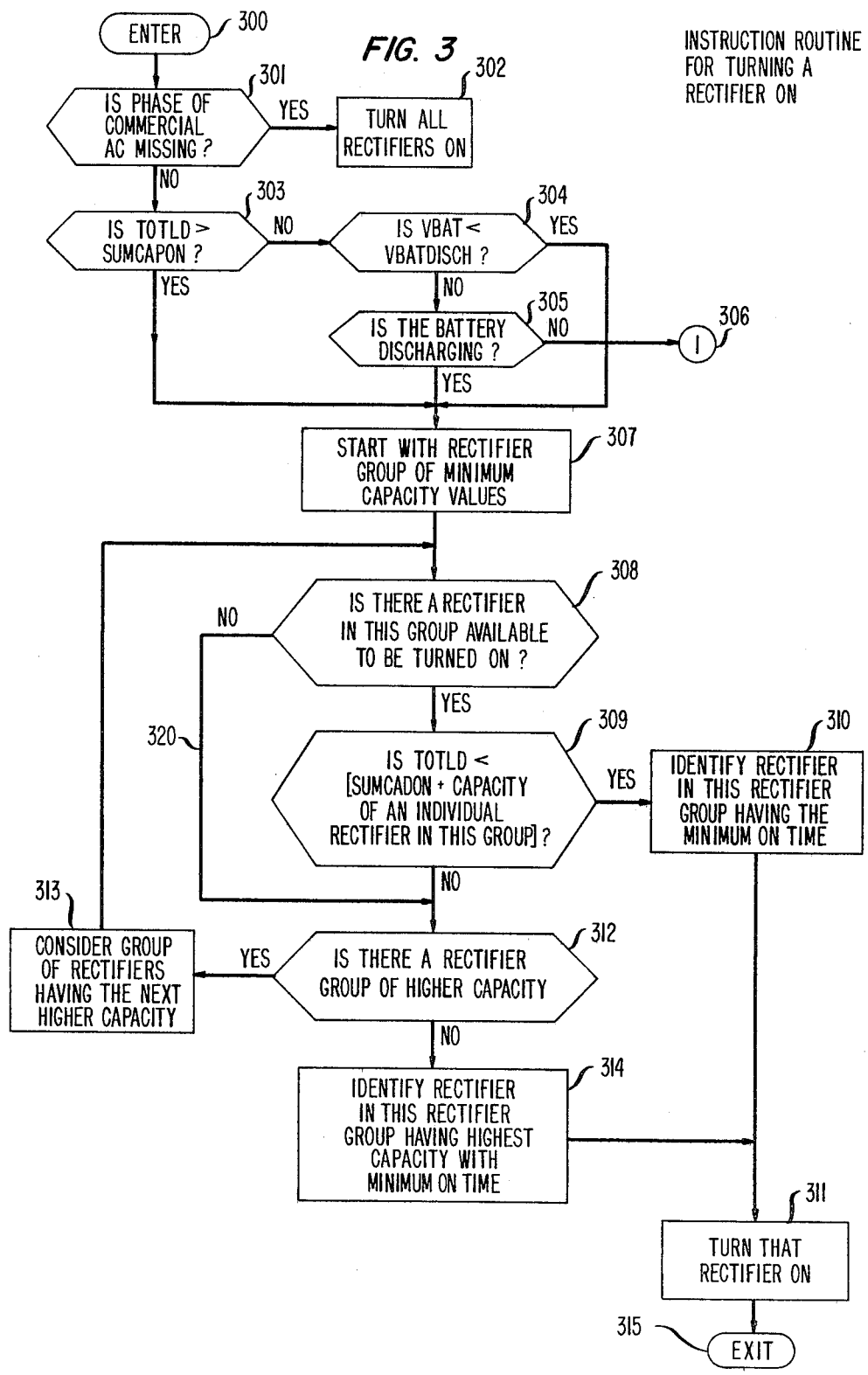

RECTIFIER CONTROL SYSTEM FOR A DC POWER PLANT SYSTEM

TECHNICAL FIELD

This invention relates to a control system for controlling the operation of a plurality of rectifiers of a DC power plant system, and it is specifically directed at a stored program control system operated to maximize the system power efficiency of the DC power plant system through controlled enabling and disabling of the individual rectifiers.

BACKGROUND OF THE INVENTION

In prior art DC power plant systems which comprise a plurality of rectifiers, considerable efforts have been expended in improving the energy efficiency of the individual rectifier and distribution components. However, little attention has been directed to improving the efficiency of such DC power plant systems at the overall system level. Indeed, whatever attempts have been made to improve the system efficiency have been schemes to minimize energy dissipation in the individual coponents.

SUMMARY OF THE INVENTION

Therefore in accord with the principles of the present invention, the operating efficiency of a DC power plant system is optimized by controlling the power plant system so that the individual operating rectifiers of the system are each operating at their most efficient operating level or are turned off. A stored program control system periodically monitors the operational status of the individual rectifiers and the load requirements of a distribution network powered by the power plant system and in response thereto enables or disables individual rectifiers of the power plant system so that the power efficiency of the entire system is always maximized.

Individual rectifiers of the power plant system are classified according to their power rating into groups of equal power ratings. Total load demand is compared with the total rated power capacity of all the currently operating rectifiers, and when load demand exceeds this capacity, the control system turns on additional individual rectifiers of the group having the necessary power rating, so that the rated power capacity of operating rectifiers equals or exceeds the load demand.

A similar inverse process is utilized to turn off rectifiers when total load demand is less than the rated power capacity of currently operating rectifiers by selecting rectifiers in the group having the necessary power ratings for turn off to reduce the sum of rated capacities of operating rectifiers to the load demand.

The stored program control system monitors and keeps continuous historical records of the total operating times of all the individual rectifiers in the system, and when a rectifier must be added or deleted to meet a changed load demand, the selection is controlled, in part, by this historical record to equalize the total operating times of the rectifiers in each group. Hence, the operating times of all the individual rectifiers in the power plant are nearly equalized thereby increasing the total reliability of this system.

BRIEF DESCRIPTION OF THE DRAWING

An understanding of the invention may be readily attained from the detailed description hereinbelow and the accompanying drawing in which

FIG. 3 is a flow chart representation of a turn-on instruction routine of the stored program controlling the rectifiers of the DC power plant system;

DETAILED DESCRIPTION

Figure 1:
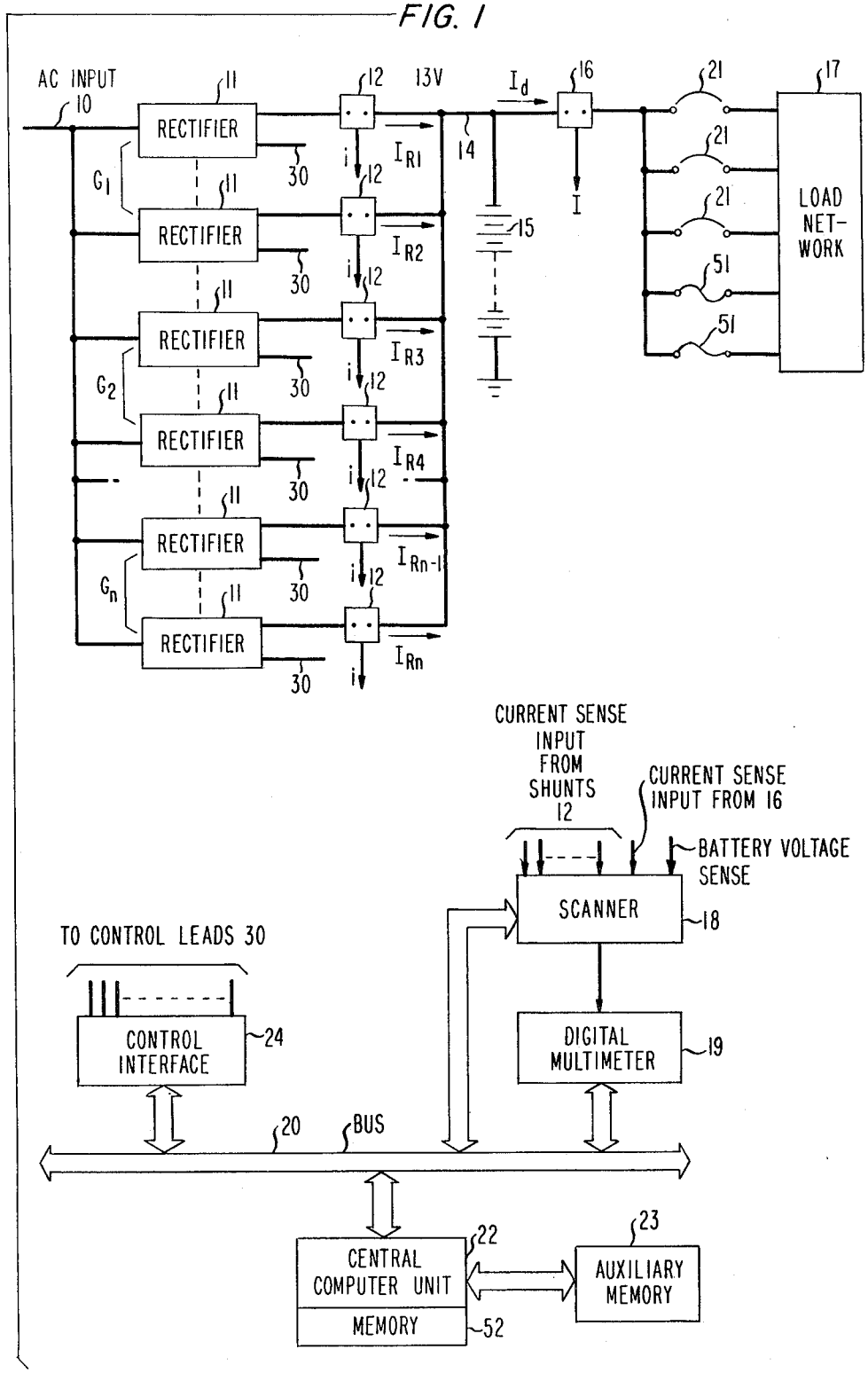
FIG. 1 is a block schematic of a DC power plant system including data processing equipment permitting stored program control of the system operation.

A DC power plant system, disclosed in FIG. 1, has the operation and the ON/OFF state of the individual rectifiers controlled by a stored program control system in order to optimize power efficiency. Commercial AC, which may be three-phase or single-phase, provides common power via input bus 10 to a plurality of ferroresonant rectifiers 11 that are grouped according to their rated output power capacity into classes of rectifiers of equal rated power output capacity G1, G2, G3, etc. The current output lead of each rectifier includes a current sensing shunt 12 so that its individual output load current can be readily monitored. Each of the rectifiers 11 includes input control leads 30 to control the turning on and off of the rectifiers.

Figure 2:
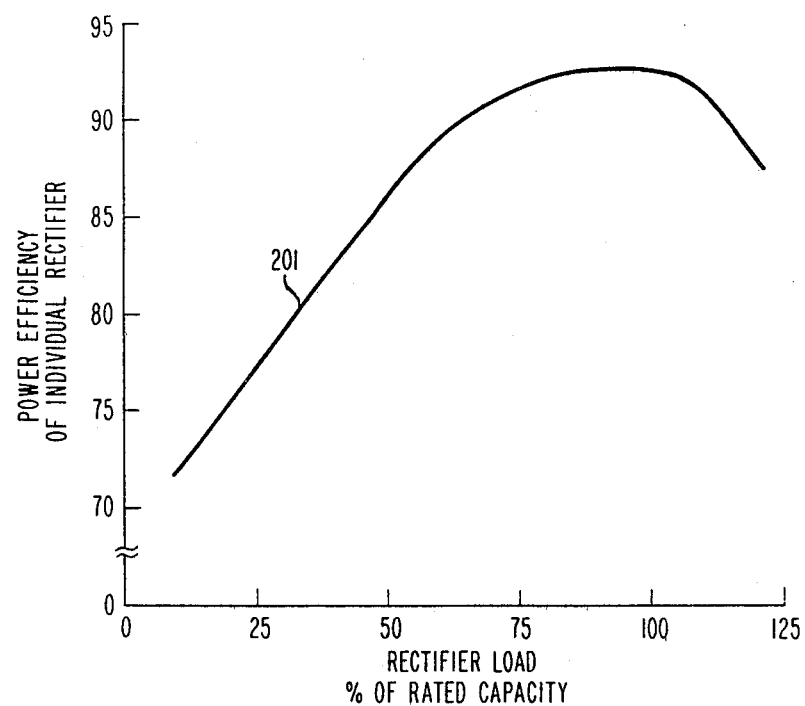
FIG. 2 is a graph of rectifier efficiency characteristics for a typical individual ferroresonant-type rectifier.

The rectifiers 11, as disclosed herein, are considered to be ferroresonant-type rectifiers. A comprehensive description of a controlled ferroresonant rectifier suitable for use herein may be found in U.S. Pat. No. Re. 27,916 (Feb. 12, 1974) issued to R. J. Kakalec. An efficiency characteristic of an individual ferroresonant rectifier is shown by curve 201 in the efficiency graph of FIG. 2. It is apparent from this graph that the ferroresonant rectifier operates most efficiently when it is operating near to or at its full-load rated capacity and hence rectifiers are turned on and off so that a load demand is fully met by rectifiers that are operating at their full or 100% load rated capacity.

While the invention herein is disclosed as using ferroresonant rectifiers, it is to be understood that the invention may be used with other types of rectifiers, such as controlled SCR rectifiers, in which case, the control system must be adapted to the particular efficiency characteristics of that type of rectifier.

The outputs of all the rectifiers 11 are connected in parallel to a power line or bus 14 which, in turn, is connected through a current sensing shunt 16 and a plurality of circuit breakers 21 and fuses 51 to individual networks in a distributed load network 17. Load network 17 may represent a telephone network in a central office, however, the invention is not limited to this particular type of load. The load requirements vary with time; and this, in turn, changes the total load current which the rectifiers must supply. Load 17 may also change due to opening and closing of selected circuit breakers 21.

A reserve DC voltage source 15, shown herein as a battery, is also connected to power line 14 and may provide part of the load current, with the rest of the current being supplied by the rectifiers. Current shunt 16 permits monitoring of the current drain of the distributed load 17.

Since load 17 varies considerably over any extended period of operation, the number of rectifiers turned on to supply current to the load must change with each new level of load current demand, in order to operate the power plant system at its most efficient level of operation. This operating control is provided by a stored program control incorporated in memory in a central computer unit 22 and by the use of interfacing circuits that cause the stored program control to interact with the DC power plant system.

Central computer unit 22 includes a stored program in memory 52 that is operative to direct the response of the rectifiers 11 to any changed load demand. Computer unit 22 may comprise any minicomputer or microcomputer determined to have sufficiently fast operating speed and data handling capacity to meet system control requirements. In the instant example, a Digital Equipment Corporation 11/03 microcomputer is being used, however, the invention is not limited to this particular equipment. Computer unit 22 is coupled to an auxiliary magnetic storage unit 23, which may comprise but is not limited to, a floppy disk storage system. Storage unit 23 is utilized, in part, to maintain a file of complete operating histories of each of the individual rectifiers 11.

Central computer unit 22 is connected to peripheral interface units through a microcomputer bus 20. In the example herein, an IEEE Standard 488 bus is used, however, many other equivalent busses may be used. Output signals from the bus 20 to control individual rectifiers go through a control signal interface 24 which may comprise a multiprogrammer unit containing individual digital input/output cards. Multiprogrammers and cards are available commercially; a suitable unit is the 6940B multiprogrammer available from Hewlett Packard Corp. The particular input/output cards utilized in the control signal interface 24 to couple computer commands to control leads 30 of individual rectifiers 11 are relay driver-type output cards.

The current in shunts 12 and 16 and the battery voltage at node 13 is monitored via scanner circuit 18. Scanner circuit 18 is a computer controlled scanner multiplexer operative for coupling the sensed current and voltage signals to a computer controlled digital multimeter 19. A scanner multiplexer unit suitable for use herein is the Hewlett Packard multiplexer scanner model 3495A, although many equivalent substitutes will suggest themselves to those skilled in the art. Digital multimeter 19, under control of computer 22, measures the analog input supplied by scanner 18 and applies its equivalent digital value to the bus 20.

The stored program control in the central computer unit 22 responds to these measurement values on bus 20 and generates output control directives which it supplies to the control signal interface 24. Output signals supplied by control signal interface 24 are applied directly, via lead 30, to operation control ports of the rectifiers 11 to selectively turn them on or off. The power plant system is operated so that periodically every hour all the rectifiers are turned on. This assures that the large capacity rectifiers do not always carry the load for an excessive period of time by allowing the selection process to reinitialize periodically. The selection of particular rectifiers is under control of the stored program control instructions, detailed below, which is periodically operated every 20 seconds in the illustration embodiment herein.

A more detailed description of the hardware and control methods by which a computer may service, operate relays and read sensing meters and record and respond to this information is disclosed in an article "Automated Testing of Power Supplies" by Richard E. Ellenbogen and John Tardy in the IEEE INTELEC Conference Proceedings 1979, pages 42–52.

In the particular control system embodiment disclosed herein in FIG. 1, the rectifiers' operating history, their output currents, the battery voltage and the total load current or drain are monitored and comprise the primary control variants which are processed by the stored program control to determine the selection of rectifiers to be turned on or off. The rectifier output load currents, designated $I_{R1}$ through $I_{Rn}$, are sensed at the current shunts 12, (where subscript n is the total number of rectifiers in the plant). The total load current or drain current $I_d$ supplied to load network 17 is sensed at current shunt 16. It is readily apparent to those skilled in the art that these current values are sufficient to determine if the battery 15 is charging or discharging. Depending upon the charging state of battery 15, the total plant current demanded (designated TOTLD) of the rectifiers is the maximum value of either the sum of the rectifier load currents $I_{R1}$ through $I_{Rn}$ (designated TOTRECI) or the total drain current $I_d$ (designated IDRAIN) which may be expressed as $$\text{TOTLD} = \max \text{ of } \{\text{TOTRECI; IDRAIN}\} \quad (1)$$

The individual and summed capacities of the rectifiers 11 included in the DC power plant system are included in a look up table within the storage elements of the computer. Included therein as information is the current operating status of each rectifier 11, its rated capacity, its group designation and its history of operating time. Individual rectifiers of identical power output capacities are segregated as indicated above into groups of rectifiers of equal power rated operating capacity.

The stored program control processes the acquired current and voltage data and determines whether to add, delete or leave unchanged the number of operating rectifiers in the power plant system. For example, if the total load current demand exceeds the sum of the capacities of the operating rectifiers, additional rectifiers are turned on to satisfy the load requirements, and to bring about a more power efficient operating state for the power plant system. An excess of rated load capacity of the operating rectifiers will result in certain operating rectifiers being turned off. Selections of which particular rectifiers to activate or deactivate depend upon the group into which it is segregated and its past operating history.

The stored program control, as indicated above, in selecting a rectifier for turn on or turn off, acts to equalize the operating times of the rectifiers. At the commencement of operation of the power plant system, the stored program includes a routine to continuously measure and maintain a record of total elapsed time. A measure of the operating time of each rectifier is maintained by responding to its turn-on and turn-off control signals to determine the quotient of its operating time to the total elapsed time. This value is denoted as the ON-TIME, a numerical value associated with each individual rectifier. When the stored program control system determines that a rectifier from a particular group is to be turned on, the stored program control chooses the rectifier with the minimum ONTIME value among the various rectifiers that are available to be selected. Similarly in turning off a rectifier, the rectifier with the maximum value of ONTIME is selected.

Figure 4:
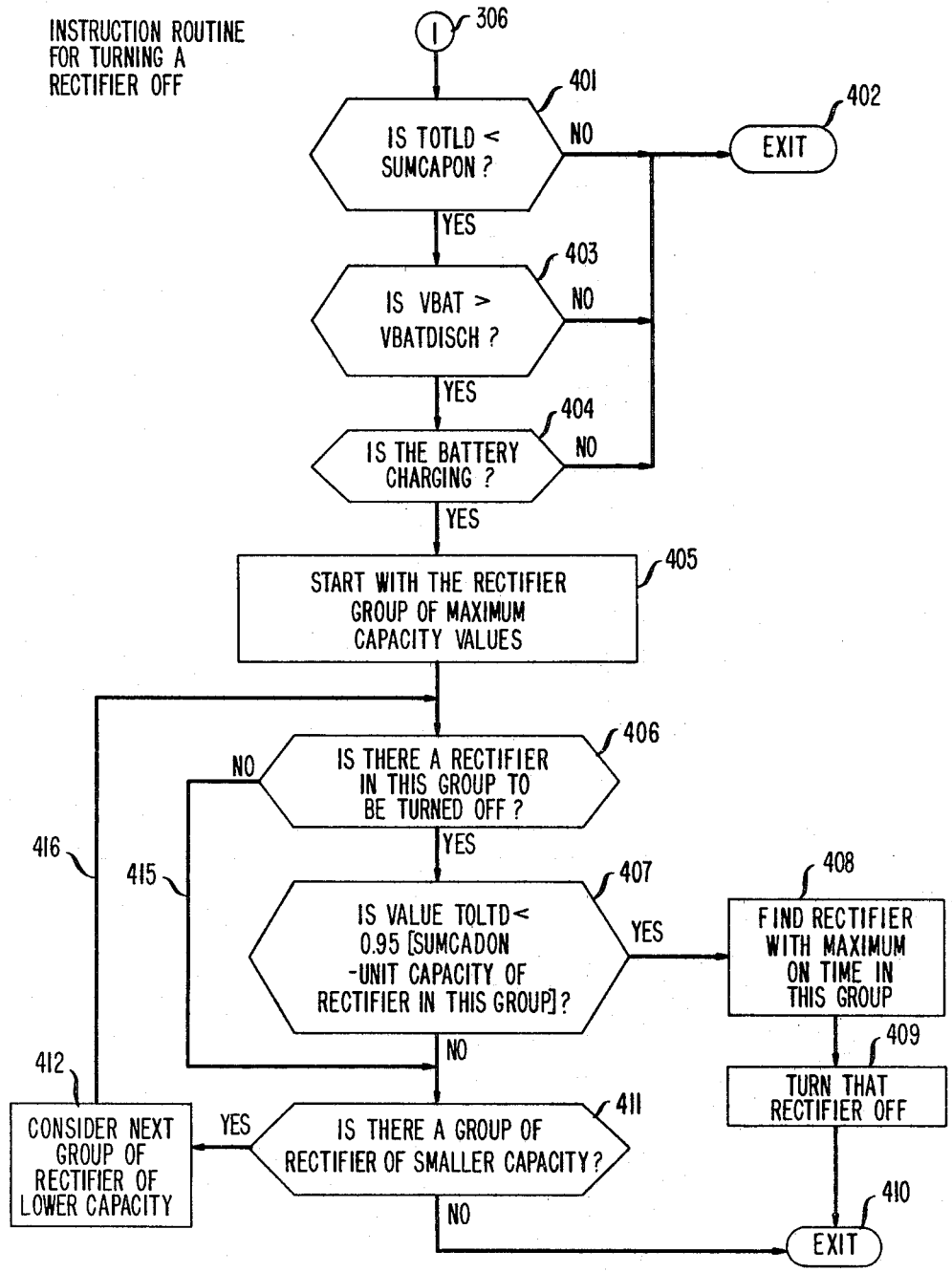
FIG. 4 is a flow chart representation of a turn-off instruction routine of the stored program controlling the rectifiers of the DC power plant system.

A detailed understanding of the operation of this control system to improve power efficiency may be attained by reference to the flow charts disclosed in FIGS. 3 and 4 which describe the important functional operating steps of the turn-on and turn-off instructions in the stored program control in achieving maximum system power efficiency for the DC power plant. The flow chart processes are implemented in the instant example in C Language on a UNIX TM Operating System. The implementation, however, is not limited to these languages and those skilled in the art will be readily able to implement it in other languages.

The following are definitions of certain mnemonic terms used in the flow charts of FIGS. 3 and 4.

| | |
|---|---|
| IBAT | Represents the current flow into or out of the battery. A positive value indicates a charging current. |
| IDRAIN | Represents the total load current ($I_d$ of FIG. 1). |
| ONTIME | Represents the quotient of the operating time of a rectifier to the total elapsed time since installation. |
| RCTST | Represents a word or bit indicating the status of a rectifier. |
| SUMCAPON | Represents the sum of the output capacities of all the rectifiers currently turned on. |
| TOTLD | Represents the total current demanded by the load network and the battery. |
| TOTRECI | Represents the sum of the output currents of all the operating rectifiers. |
| VBAT | Represents the battery voltage. |
| VBATDISCH | Represents a predetermined battery threshold voltage at which a discharge of the battery is assumed. |

The flow chart of FIG. 3 describes the turn-on instruction procedure of the stored program control to activate additional rectifiers 11 when load demand (TOTLD) of the power plant system increases beyond the summed capacity (SUMCAPON) of currently operating rectifiers.

This condition may be due to a changed load demand, a failure of the AC input to the power plant system or an additional current drain caused by a discharged battery.

The turn-on routine of FIG. 3 and the subsequent turn-off routine is periodically called by the operating system in the illustrative embodiment every 20 seconds and begins at entry terminal 300. It operates to turn on a rectifier 11 which had previously been off whenever total load demand (TOTLD) exceeds the rated power capacity of currently operating rectifiers (SUMCAPON) of if the voltage of battery 15 drops below a predetermined threshold. At the first decision symbol 301, the instruction routine determines the operative condition of all the phases of a three-phase commercial AC input. If all three input phases have failed, a command of the routine expressed in process symbol 302 is implemented to turn on all the rectifiers 11 regardless of efficiency to compensate for the lost input phases. Power in this situation is derived from a reserve energy system which is included with many power plant installations to provide protection agains failure of the commercial AC power. Reserve energy systems are well-known and hence are not disclosed herein.

If all the AC input phases are properly operating, the instruction routine, as shown in decision symbol 303, proceeds to determine if the total load demand (TOTLD) exceeds the sum of the rated power capacities of the rectifiers presently operating (SUMCAPON). When the total load demand (TOTLD) does not exceed presently operating rated power capacity, the present battery voltage (VBAT) is compared as indicated by decision symbol 304 with a preset voltage threshold (VBATDISCH) in the next instruction. If the battery voltage is above the threshold, the total output currents at the shunts 12 of the operating rectifiers and the load current at shunt 16 are analyzed, as indicated by decision symbol 305, to determine if the battery 15 is discharging. A no answer indicating a nondischarge condition causes the instruction routine to continue, via connector 306 to the turn-off routine of FIG. 4.

A yes answer to the question of decision symbol 303 or to either of the two questions of decision symbols 304 and 305 are all positive indications that additional operating rectifier capacity is needed.

A subsequent instruction shown in processing symbol 307 implements a command that all the rectifiers segregated into the class of the lowest power rated rectifiers are to be considered first for possible turn on to meet the increased load demand. Rectifiers in this lowest power rated group are subjected by the instruction routine to the decision consideration of decision symbol 308 which determines if this selected group includes any operative rectifiers which are currently turned off. If currently nonoperating rectifiers in this group are available for turn on, the next decision function of the instruction routine shown in decision symbol 309 determines if an individual power rating value of one rectifier of this group added to the sum of the power rating capacity of currently operating rectifiers (SUMCAPON) is sufficient to equal or exceed the present total load demand (TOTLD). If energizing of a rectifier of this group meets this power capacity requirement, the instruction routine proceeds to identify and select the nonoperating rectifier unit in this segregated set or class with the minimum operating time, as indicated in process symbol 310, and to turn it on as indicated in process symbol 311. The instruction routine proceeds to exit terminal 315.

The decision of the instruction routine indicated in decision symbol 308 may have indicated that all the rectifiers in this particular lowest power rated group investigated are currently activated. In this case or in the case of a negative answer to the question of decision symbol 309, the instruction routine proceeds to a subsequent decision function shown by decision symbol 312 which is accessed via flow path 320. This decision function determines if a next higher power rated group of rectifiers exists. If such is the case, a command is issued, as shown by process symbol 313, to consider selecting a rectifier to turn on in this new group by subjecting these rectifiers to the decision functions described above and disclosed in symbols 308, 309, 310 and 311 which can result in a rectifier of that higher capacity rating being turned on. If no higher rated capacity group of rectifiers exist, this means that no single rectifier can satisfy the load demand. In this case, the instruction routine proceeds to select a rectifier unit with minimum ONTIME in the present group under consideration, as indicated by process symbol 314 and a subsequent command of the instruction routine shown in process symbol 311, turns that selected rectifier unit on, thus completing the turn-on instruction routine which proceeds to the exit terminal 315.

Upon completion of the turn-on routine, the instruction routine returns control to the calling program, bypassing the turn-off routine, via exit terminal 315, or proceeds via connector 306 to the turn-off instruction routine shown in the flow chart of FIG. 4. A first determination of the turn-off instruction routine as shown by decision symbol 401 considers if the total load demand (TOTLD) is less than the sum of the rated power capacities (SUMCAPON) of the presently operating rectifiers. If the load demand equals or exceeds that sum, the turn-off routine is terminated, via exit terminal 402. When total load demand is less than the present rated power capacity of operating rectifiers, the magnitude of the battery voltage (VBAT) is compared by the instruction with the reference value (VBATDISCH), as indicated in decision symbol 403. If this sensed voltage (VBAT) is less than the reference value (VBATDISCH), the instruction routine immediately terminates at exit terminal 402 and no rectifiers are turned off. A decision that the battery voltage (VBAT) exceeds the reference value (VBATDISCH), advances the instruction routine to a subsequent decision, as shown by decision symbol 404 whereat, it is determined if the battery 15 is charging or not charging by examining the relative values of TOTRECI and IDRAIN to determine IBAT. If it is not charging, the control routine is terminated via exit terminal 402. The net effect of no answers to the previous three decisions functions of the instruction routine is that no rectifier can be turned off at this point.

A yes determination that the battery 15 is indeed charging in combination with positive determinations that operating rectifier capacity is adequate and that battery voltage is above the threshold reference (VBATDISCH), as shown in decision symbols 401 and 403, indicates that the rated power capacity of operating rectifiers (SUMCAPON) is in excess of load network power needs and that it may be possible to turn a presently operating rectifier off.

The turn-off instruction routine proceeds to examine the group of rectifiers of maximum rated power capacity, as per the command of process symbol 405, and determines, per decision symbol 406, if there is an existing operating rectifier in that group which can be turned off. If such a rectifier exists, the total load demand is compared with a weighted sum (an arbitrarily selected factor of 0.95) of the total capacity of currently operating rectifiers (SUMCAPON) minus the rated power capacity of a single unit in this selected group. This comparison may be expressed as TOTLD<0.95 {SUMCAPON-Rated Power of Single Unit}  (2)

the factor of 0.95 being used to weigh the computer sum to introduce a controlled hysteresis into the turn-on/off routines to avoid frequent turn-on and turn-off actions when operating rectifier power capacity and load power demand differ by very small amounts.

If the comparison of decision symbol 407 shows that total load demand is less than this weighted value, the command of process symbol 408 is executed to find the unit in this group of rectifiers with maximum ONTIME. That particular unit is then turned off, as indicated by process symbol 409, and the instruction routine is subsequently terminated via exit terminal 410.

If, however, comparison function of decision symbol 407 yields a negative answer, that is weighted capacity computed therein is equal to or less than total load demand, a subsequent instruction shown by decision symbol 411 determines if a smaller capacity group of rectifiers exists. The control instruction shown by decision symbol 411 is also engaged directly via flow line 415 if the previous determination shown by the decision symbol 406 has indicated no operative rectifiers are available to be turned off in the group of rectifiers then under consideration. The availability of a smaller power rated group as per decision symbol 411 results in a selection of this group for evaluation per the command shown by process symbol 412 whereupon the evaluation proceeds via flow line 416 and the evaluation process starting at decision symbol 406 is repeated. Lack of availability of a smaller capacity group as indicated by decision symbol 411 terminates the routine, via exit terminal 410.

Figure 5:
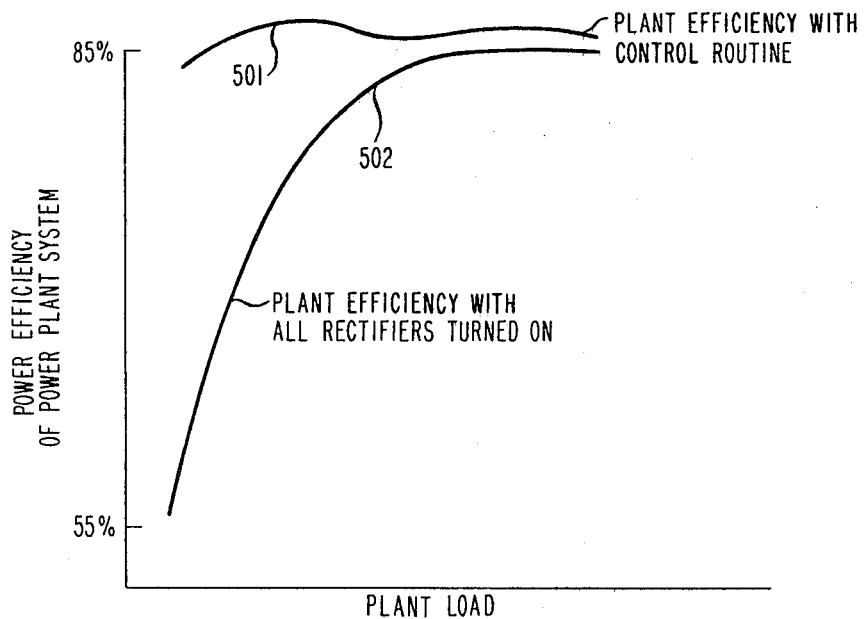
FIG. 5 is a graph of the DC power plant system efficiency characteristics with and without the control system disclosed herein.

Results of these turn-on and turn-off instruction routines in attaining superior plant efficiency is indicated in the graph in FIG. 5, wherein the efficiency curve 501 of the graph representing a power plant system efficiency where the rectifiers are controlled according to the principles of the invention, shows significantly better efficiency characteristics than the efficiency curve 502 which represents the efficiency curve of a rectifier power plant wherein all rectifiers are continuously turned on.

The above described operating procedures may be implemented in a stored program control in any suitable programming language capable of interacting with outside components in a real time control environment. In the illustrative embodiment herein, the programming language C has been used to implement the stored program control although the invention here is not limited to the use of that language. The attached appendix is a listing of the program used to control rectifier selection. It is disclosed for illustrative purposes only and is not intended to be limiting.

The initial lines 1 through 25 of the attached C language program initialize, set and define the various constants and variables to be used in the program. VBATDISCH, for example, is a term representing a battery threshold voltage at which discharge is considered to occur. IBATDISCH is a battery current discharge threshold. Lines 6 through 11 specify the storage class reservations which require an external definition.

Lines 26 to 36 of the program are operative to turn on all the rectifiers if all three phases of the three-phase AC input are missing.

A WHILE statement, which is a basic looping mechanism in C language begins at line 40 and continues to line 119. This WHILE statement is inclusive of the various instructions to turn on rectifiers and includes the IF statements beginning at lines 45, 56 and 74. The WHILE statement in its entirety tests the basic expression; does the rated capacity of operating rectifiers equal or exceed the load current demand. As long as the condition is not met, the individual IF testing statements are implemented. The IF statement at line 45 issues an alarm if the available rectifiers cannot carry the load, and the WHILE loop is exited. Subsequent IF statement at line 56 determines if the capacity of available rectifiers is sufficient and includes an ELSE clause, at line 64, which covers instructions executed if rectifiers are available. Included within the ELSE routine is the IF statement, at line 74, which polls the rectifiers and picks the rectifiers with the desired capacity to render operational and having the least elapsed on time. An IF statement at line 97 turns on the largest available rectifier with minimum on time if no one rectifier can supply needed capacity.

A subsequent WHILE statement at line 129 includes instruction routines to turn off operating rectifiers if their capacities in sum total have excess capacity relative to load demand. Its included IF statement at line 141 uses a hysteresis factor in a decision to delete rectifiers in order to avoid continuous additions and deletions of rectifiers around some indeterminate point.

The above described program disclosed in C language is compiled and the resulting object code operates in real time to control the rectifier power plant. Many variations will suggest themselves to those skilled in the art which do not depart from the spirit of the invention.

```
1      #include "sbp.h"
2      #define VBATDISCH 51.5
3      /* 25.75 (51.50) for 24V (48V) plant */
4      #define IBATDISCH -4.0
5      /* -1.0 (-4.0) for 24V (48V) plant */
6      extern struct rectdata rct[];
7      extern struct pltdata plt;
8      extern double batti, battv;
9      extern int recthdr[RECTNO+1],recgrno;
10     extern int rectord[RECTNO+1];
11     extern int norect,fl__asw;
12     rcteff( )
13     /* rectifier efficiency algorithm */
14     {
15     double sumreci( );
16     double max( );
17     static int man;
18     /* static int flg__ON = 0; */
19     double sumcapON( );
20     double totreci; /* actual current
21     drain from all rectifiers */
22     int flg__norect, flg__recton,
23     flg__noOFF;
24     int i,ii,k,kk;
25     int jj; /* jj = rectifier index */
26     /* try to turn on all rectifiers
27     showing negative state flag */
28
29     if(plt.ac__st == 3)
30     /* all three phases missing */
31     {
32     for (k=1; k<=norect; k++)
33     turnON(k);
34     /* turn all rectifiers ON */
35     return;
36     }
37     flg__norect = 0; /* test if some
38     rectifier will be available */
39
40     while ( (totreci = sumreci( )) >=
41     1.0 * sumcapON( ) ||
42     ( (batti < IBATDISCH)
43     && (battv < VBATDISCH) ) )
44     {
45     if (flg__norect == 1)
46     /* if available rect's
47     can't carry load */
48     {
49     almload( );
50     /* continue issuing alarm */
51     break;
```

-continued
```
52     }
53     flg__recton = 1;
54     /* haven't yet found 1 rect
55     to carry excess load */
56     if (rectopOFF( ) <= 0)
57     /* no more operational rect's off */
58     {
59     flg__norect = 1;
60     /* available rect's
61     can't carry load */
62     return;
63     }
64     else
65     {
66     /* go thru groups in
67     ascending order of capacity */
68     for (i=1; i <= recgrno; i++)
69     {
70     for (ii=recthdr[i];
71     ii<recthdr[i+1]; ii++)
72     {
73     jj = rectord[ii];
74     if( (rct[jj].state == 0) &&
75     (max(totreci,
76     (totreci-batti) ) <1.0 *
77     (sumcapON( )+rct[jj].cap)))
78     /* if this rect can
79     carry excess load */
80     {
81     updateON( ); /* get % of
82     rect's on time */
83     jj = minONtm(i);
84     /* get rect in group
85     with min on time */
86     turnON(jj);
87     /* turn it on */
88     printf(" * PRGM CONTROL:
89     Rect %d ON \n",jj);
90     flg__recton = 0;
91     /* single rect picked
92     up excess load */
93     return;
94     }
95     }
96     }
97     if(flg__recton == 1)
98     /* no one rect can
99     pick up excess load */
100    /* turn on largest rect.
101    with min. on time */
102    /* go thru groups
103    in descending order of cap. */
104    for (i= recgrno; i >=1; i--)
105    }
106    update( );
107    /* get % of rect's
108    on time */
109    if( (jj=minONtm(i) ) > 0)
110    {
111    printf(" \n NO single
112    rect; turn largest
113    rect ON \n");
114    turnON(jj);
115    return;
116    }
117    }
118    }
119    }
120    /* Since available rect's can carry
121    load, we next examine whether it
122    is possible to turn a rect off;
123    if yes, we turn off the one with max.
124    capacity, such that the rest
125    can still carry the load */
126    flg__noOFF =0;
127    /* no rect was turned off;
128    becomes 1 when that happens */
129    while ( ( (totreci = sumreci())
130    < 1.0 * sumcapON( ) ) &&
```

-continued

```
131         (batti > IBATDISCH) &&
132         (battv > VBATDISCH) )
133         {
134         for (i = recgrno; i>=1; i--)
135         /* go thru grps in
136         descending cap order */
137         for (ii = recthdr[i];
138         ii < recthdr[i+1]; ii++)
139         {
140         jj = rectord[ii];
141         if ( (rct[jj].state == 1) &&
142         ( ($.+max(totreci,
143         (totreci-batti)) < .95 *
144         sumcapON() - rct[jj].cap) ) )
145         /* the 2. is there so that
146         at least one rect
147         stays ON always */
148         /* the .95 is there to
149         introduce hysteresis
150         (so that we do not turn
151         rec's on and off continuously
152         around a break point) */
153         {
154         updateON( ); /* get % of
155         rect's on time */
156         jj = maxONtm(i);
157         /* get rect in group
158         with max on time */
159         turnOFF(jj);
160         /* turn it off */
161         printf(" * PRGM CONTROL:
162         Rect %d OFF \n",jj);
163         flg_noOFF = 1;
164         /* a rect was turned off */
165         return;
166         }
167         }
168         if (flg_noOFF == 0)
169         /* if no rect was turned
170         off in this cycle */
171         return;
172         }
173         /*set flag to indicate a rect is shown
174         to be on (state = 1)
175         but not delivering load */
176         return;
177         }
175         double max(a,b)
176         double a,b;
177         {
178         return( (a>b) ? a : b);
179         }
```

What is claimed is:

1. A method of controlling an ON/OFF operational state of individual rectifiers in a power plant system to maximize power efficiency of the power plant system comprising the steps of determining a present load current demand for a load energized by the power plant system, determining a sum of rated current capacities of rectifiers presently operating, periodically comparing the present load current demand with the sum of rated current capacities of presently operating rectifiers and establishing a difference value between the sum of rated current capacities and the load current demand, periodically responding to the difference value between the load current demand and the sum of rated current capacities of presently operating rectifiers by changing an operational state of a sufficient number of rectifiers selected with specific rated capacities so as to have a sum of rated current capacities of subsequently operating rectifiers substantially equal to the load current demand.

2. A method of controlling individual rectifiers in a power plant as defined in claim 1 whereby the step of periodically responding to a difference comprises a step of considering selection of rectifiers to be changed in operational state by arranging rectifiers into groups of identically current rated rectifiers and investigating the groups of different current rating capacity in sequential fashion for selection of a rectifier for changing the operational state thereof and changing operational state of a rectifier from a group selected so that a quanta of identical rated current capacities of this group of rectifiers is substantially equal to the difference between load current demand and the sum of rated current capacities of presently operating rectifiers.

3. A method of controlling an ON/OFF operational state of individual rectifiers in a power plant system to maximize power efficiency of the power plant system comprising the steps of;

periodically comparing load current demand for a load energized by the power plant system with a sum of rated current capacities of presently operating rectifiers, periodically responding to a difference between the load current demand and the sum of rated current capacities of presently operating rectifiers by changing an operational state of a sufficient number of rectifiers so as to have a sum of rated current capacities of subsequently operating rectifiers substantially equal to the load current demand, and including a step of considering selection of rectifiers to be changed in operational state by arranging rectifiers into groups of identically current rated rectifiers and investigating the groups of different current rating capacity in sequential fashion for selection of a recteifor for changing the operational state thereof and changing operational state of a rectifier from a group selected so that a quanta of identical rated current capacities of this group of rectifiers is substantially equal to the difference between load current demand and the sum of rated current capacities of presently operating rectifiers.

4. A method of controlling individual rectifiers in a power plant as defined in claim 3 and further including the steps of recording accumulated operating times of all individual rectifiers of the power plant system, and the step of considering selection including a step of selecting rectifiers in each group to be changed in operational state according to accumulated operating time so as to equalize accumulated operating time of all rectifiers in each individual group.

5. A method of controlling individual rectifiers in a power plant system as defined in claim 4 and further including the steps of determining if a reserve battery voltage source is discharging and increasing a number of rectifiers operating to compensate for a detected discharge condition of the reserve battery voltage source.

6. A method of controlling individual rectifiers in a power plant system as defined in claim 5 and further including the steps of checking the existence of all phases of a multiphase input AC signal applied to the power plant, and turning on all the individual rectifiers of the power plant system in response to determination of a failure of the input AC signal.

7. In a power plant system including a plurality of individual rectifiers, input means for coupling AC power to the rectifiers, output means for coupling the rectifiers to a load, apparatus responsive to load current demands for controlling an ON/OFF operational state of the individual rectifiers in order to maximize power efficiency of the power plant system comprising means for determining a sum of rated capacities of rectifiers presently operating, means for sensing a load current demand, means for periodically comparing the load current demand with the sum of rated current capacities of presently operating rectifiers to establish a difference value between the sum of rated current capacities and the load current demand, and means for periodically responding to the difference value between the load current demand and the sum of rated current capacities of presently operating rectifiers and operative for changing an operational state of at least one rectifier selected with a rated capacity so as to have a sum of rated current capacities of subsequently operating rectifiers substantially equal to the load current demand.

8. In a power plant system as defined in claim 7 wherein said apparatus for controlling further includes having said individual rectifiers arranged into individual groups of rectifiers of identical current rated capacity, and means for selecting an individual rectifier by investigating each of the individual groups of rectifiers in sequential fashion for selection of an individual rectifier within the individual group and means for changing the operational state of that individual rectifier.

9. In a power plant system including a plurality of individual rectifiers, input means for coupling AC power to the rectifiers, output means for coupling the rectifiers to a load, apparatus for controlling an ON/OFF operational state of the individual rectifiers, which are arranged into individual groups of rectifiers of identical current rated capacity, in order to maximize power efficiency of the power plant system comprising means for periodically comparing load current demand with a sum of rated current capacities of presently operating rectifiers, and means for periodically responding to a difference between the load current demand and the sum of rated current capacities of presently operating rectifiers and operative for changing an operational state of at least one rectifier so as to have a sum of rated current capacities of subsequently operating rectifiers substantially equal to the load current demand, and means for selecting an individual rectifier by investigating each of the individual groups of rectifiers in sequential fashion for selection of an individual rectifier within the individual group and means for changing the operational state of that individual rectifier.

10. In a power plant system as defined in claim 9 wherein said apparatus for controlling further includes means for recording accumulated operating times of all individual rectifiers of the power plant system, and said means for selecting further including means for picking a rectifier in any group of rectifiers to be changed in operational state according to accumulated operating time so as to equalize accumulated operating time of all rectifiers in each individual group.

11. A method of controlling rectifiers of a power plant system to maximize power efficiency of the power plant system in supplying power to a varying load comprising the steps of grouping all the rectifiers into classes of rectifiers of equal current rated capacity periodically determining a load current demand presently required by the varying load periodically determining a sum of rated current capacities of all rectifiers presently operating comparing the load current demand with the sum of rated current capacities and calculating a difference value selecting a rectifier from a group of current rated capacity substantially equal to but not greater than the difference value calculated and changing its operational state whereby the sum of rated current capacities of rectifiers now operating substantially equals the load current demand required by the load.

12. A method of controlling a rectifier power plant as defined in claim 11 and further including the steps of monitoring elapsed operating times of each individual rectifier and creating a stored record thereof;

choosing a rectifier in the step of selecting a rectifier by considering the rectifiers elapsed operating time and energizing a rectifier so as to equalize individual rectifier elapsed operating times in each group of rectifiers.

13. A method of controlling a rectifier power plant as defined in claim 12 and further including the steps of determining a charge-discharge status of a reserve battery voltage source, and activating additional individual rectifiers into operation to supply additional current to compensate for a battery discharge condition by selecting a rectifier from a group of proper rated capacity to counteract a discharge current.

14. A method of controlling a plurality of rectifiers in a power plant system supplying load current to a varying load comprising the steps of monitoring an elapsed operating time of each individual rectifier and creating a stored record thereof classifying each of the rectifiers into distinct groups of rectifiers, wherein each rectifier of a group has an identical rated current capacity common to that group sensing a present load current demand of the varying load periodically comparing the present load current demand with total rated current capacity of presently operating rectifiers, and responding if the present load current demand exceeds the total rated current capacity of presently operating rectifiers by turning on at least one additional rectifier by a process of selecting a presently nonoperative rectifier from a group of rectifiers with a current rated capacity that when summed with the total rated current capacity of presently operating rectifiers exceeds the present load current demand by a minimum amount, and examining the stored record of elapsed operating time of rectifiers in the group selected in the preceding step and turning on a presently nonoperative rectifier of that group having a minimum elapsed operating time.

15. A method of controlling a plurality of rectifiers in a power plant system as defined in claim 14 and further comprising the steps of
- sensing a voltage state of a battery reserve voltage source in the plant
- determining a direction of battery current flow
- determining from direction of battery current flow and battery voltage if the battery is discharging, and
- turning on an additional rectifier to supply current equal to a discharge current supplied by the battery.

16. A method of controlling a plurality of rectifiers in a power plant system supplying a varying load as defined in claim 14 and comprising the further steps of
- responding if the present load current demand is less than the total rated current capacity of presently operating rectifiers by turning off at least one presently operating rectifier by a process of
- selecting a presently operating rectifier from a group of rectifiers with a current rated capacity that when subtracted from the total current capacity of presently operating rectifiers yields a value that substantially equals present load current demand, and
- examining the stored record of elapsed operating time of rectifiers in the group selected in the preceding step and turning off a presently operative rectifier of that group having a maximum elapsed operating time.

17. A rectifier power plant including a plurality of rectifiers, input means for coupling AC power to the rectifiers, output means for coupling the rectifiers to a varying load, and control means for controlling an ON/OFF state of the rectifiers in order to maximize power efficiency, and further having the rectifiers grouped into classes of rectifiers of equal current rated capacity
- the control means including
- means for periodically determining a load current demand presently required by the varying load
- means for periodically determining a sum of rated current capacities of all rectifiers presently operating
- means for comparing the load current demand with the sum of rated current capacities and calculating a difference value
- means for selecting a rectifier from a group of rated current capacity substantially equal to but not greater than the difference value calculated and changing its operational state
- whereby the sum of rated current capacities of rectifiers now operating substantially equals the load current demand required by the load.

18. A rectifier plant as defined in claim 17 whereby the control means further includes
- means for monitoring elapsed operating times of each individual rectifier and creating a stored record thereof, and
- means, included in said means for selecting, for choosing a rectifier by considering the elapsed operating time of the rectifiers and choosing a rectifier so as to equalize individual rectifier elapsed operating times in each group of rectifiers.

19. A rectifier plant as defined in claim 18 and further including second input means for accepting a reserve battery voltage source
- means for determining a charge/discharge status of the reserve battery voltage source, and
- said means for selecting further including means for activating additional individual rectifiers into operation to supply additional current to compensate for a battery discharge condition by selecting a rectifier of proper rated capacity to supply current equal to a discharge current.

20. A power plant system comprising
a plurality of rectifiers, input means for coupling a primary AC power source to the rectifiers, output means for coupling the rectifiers to a varying load to be energized, each of the rectifiers being classified into distinct groups of rectifiers, wherein each rectifier of a group has an identical rated current capacity common to the group, control means for controlling an ON/OFF state of the rectifiers and operative for maximizing power efficiency of the power plant system, the control means comprising
- means for monitoring an elapsed operating time of each individual rectifier and creating a stored record thereof
- means for sensing a present load current demand of the varying load
- means for periodically comparing the load current demand with total rated current capacity of presently operating rectifiers, and
- means for responding if present load current demands exceeds total rated capacity of presently operating rectifiers by turning on at least one additional rectifier including
- means for selecting a group of rectifiers with a current rated capacity that when summed with total current capacity of presently operating rectifiers exceeds present load current demand by a minimum amount, and
- means for examining the stored record of elapsed operating time of rectifiers in the group selected by the means for selecting and means for turning on a presently nonoperative rectifier of that group having a minimum elapsed operating time.

21. A power plant system as defined in claim 20 wherein said power plant further includes a second input means for accepting a reserve battery voltage source and the control system further comprising
- means for sensing a voltage state of the battery reserve voltage source
- means for determining a direction of battery current flow
- means for determining from direction of current flow and battery voltage if the battery is discharging, and
- said means for turning on operative for turning on an additional rectifier to supply current equal to a discharge current supplied by the battery in response to said means for determining.

22. A power plant system as defined in claim 17 wherein the control system further comprises
- means for responding if the present load current demand is less than total rated current capacity of presently operating rectifiers by turning off at least one presently operating rectifier, and
- said means for selecting operative for selecting a presently operating rectifier from a group of rectifiers with a current rated capacity that when subtracted from total current capacity of presently operating rectifiers yields a value that substantially equals present load current demand, and means for examining the stored record of elapsed operating time of rectifiers by the group selected by the means for selecting and turning off a presently operative rectifier of that group having a maximum elapsed operating time.

23. A power plant system comprising input means for accepting a plurality of rectifier circuits, output means for coupling each rectifier circuit to a common load, first current sensing means coupled for monitoring individual current outputs of each rectifier circuit second current sensing means coupled for monitoring a current supplied to the common load, control means for controlling an ON/OFF state of the individual rectifiers, the control means including data processing means, associated memory means and interface means for coupling the data processing means to the rectifier and the first and second current sensing means first instruction means in the memory for periodically determining a load current demand presently required by the common load second instruction means in the memory for periodically determining a sum of rated current capacity of all the rectifiers presently operating third instruction means in the memory, for comparing the load current demand with the sum of rated current capacity and calculating a difference value the memory means having all the rectifiers in register and classified into groups of rectifiers of equal current rated capacity, fourth instruction means in the memory, for selecting a rectifier from a group of rated current capacity substantially equal to but not greater than the difference value calculated and changing its operational ON/OFF state whereby the sum of rated current capacities of rectifiers now operating substantially equals the load current demand required by the load.

24. A power plant system as defined in claim 23 whereby the control means further includes means for monitoring elapsed operating times of each individual rectifier and creating a stored record thereof, and instruction subroutine means included in said fourth instruction means for choosing a rectifier by considering the elapsed operating times of the rectifiers and choosing a rectifier so as to equalize individual rectifier elapsed operating time in each group of rectifiers.

25. A power plant system as defined in claim 24 and further including second input means for accepting a reserve battery voltage source fifth instruction means for determining a charge/discharge state of the reserve battery voltage source, and said fourth instruction means further including additional instruction means for activating additional individual rectifiers into operation to supply additional current to compensate for a battery discharge condition by selecting a rectifier of proper rated current capacity to supply current equal to a discharge current.

26. A power plant system comprising input means for accepting a plurality of rectifiers all powered by a primary AC power source output means for coupling power supplied by the rectifiers to a varying load to be energized, and control means for controlling an ON/OFF state of the individual rectifiers and operative for maximizing power efficiency of operating rectifiers connected to the power plant system, the control means comprising a central data processor means, memory means for storing instructions and operating data and interface means for sensing power plant conditions and translation of instructions into control signals coupled to the individual rectifiers, instruction and operating data of the memory means including means for classifying each of the rectifiers into distinct groups of rectifiers, whereas each rectifier of a group has an identical rated current capacity common to the group means for monitoring an elapsed operating time of each individual rectifier and creating a stored record thereof means for sensing a present load current demand of the varying load means for periodically comparing the load current demand with total rated current capacity of presently operating rectifiers, and means for responding if present load current demand exceeds total rated current capacity of presently operating rectifiers by turning on at least one additional rectifier including means for selecting a group of rectifiers with a current rated capacity that when summed with total current capacity of presently operating rectifiers exceeds present load current demand by a minimum amount, and means for examining the stored record of elapsed operating time of rectifiers in the group selected by the means for selecting and means for turning on a presently nonoperative rectifier of that group having a minimum elapsed operating time.

27. A power plant system as defined in claim 26 wherein said power plant further includes a second input means for accepting a reserve battery voltage source and the control system further comprising means for sensing a voltage state of the battery reserve voltage source means for determining a direction of battery current flow means for determining from direction of current flow and battery voltage if the battery is discharging, and said means for turning on operative for turning on an additional rectifier to supply current equal to a discharge current supplied by the battery in response to said means for determining.

28. A power plant system as defined in claim 27 wherein the control system further comprises means for responding if the present load current demand is less than total rated current capacity of presently operating rectifiers by turning off at least one presently operating rectifier, and said means for selecting operative for selecting a presently operating rectifier from a group of rectifiers with a rated current capacity that when subtracted from total current capacity of presently operating rectifiers yields a value that substantially equals present load current demand, and means for examining the stored record of elapsed operating time of rectifiers in the group selected by the means for selecting and turning off a presently operative rectifier of that group having a maximum elapsed operating time.

* * * * *